No. 690,089. Patented Dec. 31, 1901.
G. P. WETMORE.
VESSEL UNLOADING APPARATUS.
(Application filed Mar. 20, 1901.)
(No Model.) 2 Sheets—Sheet 1.
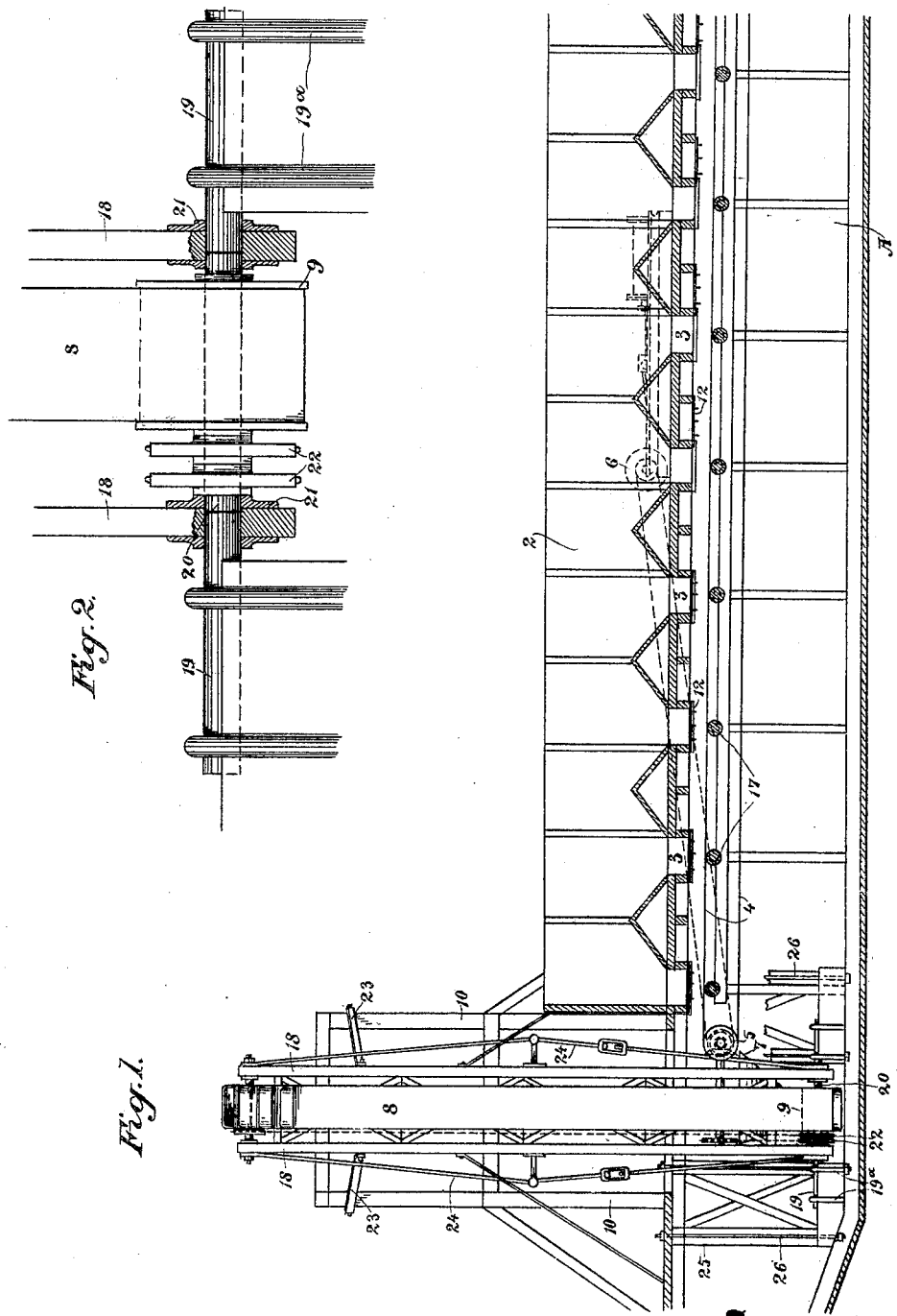
Witnesses,
Inventor,
George P. Wetmore
By Dewey Strong & Co.

No. 690,089. Patented Dec. 31, 1901.
G. P. WETMORE.
VESSEL UNLOADING APPARATUS.
(Application filed Mar. 20, 1901.)
(No Model.) 2 Sheets—Sheet 2.
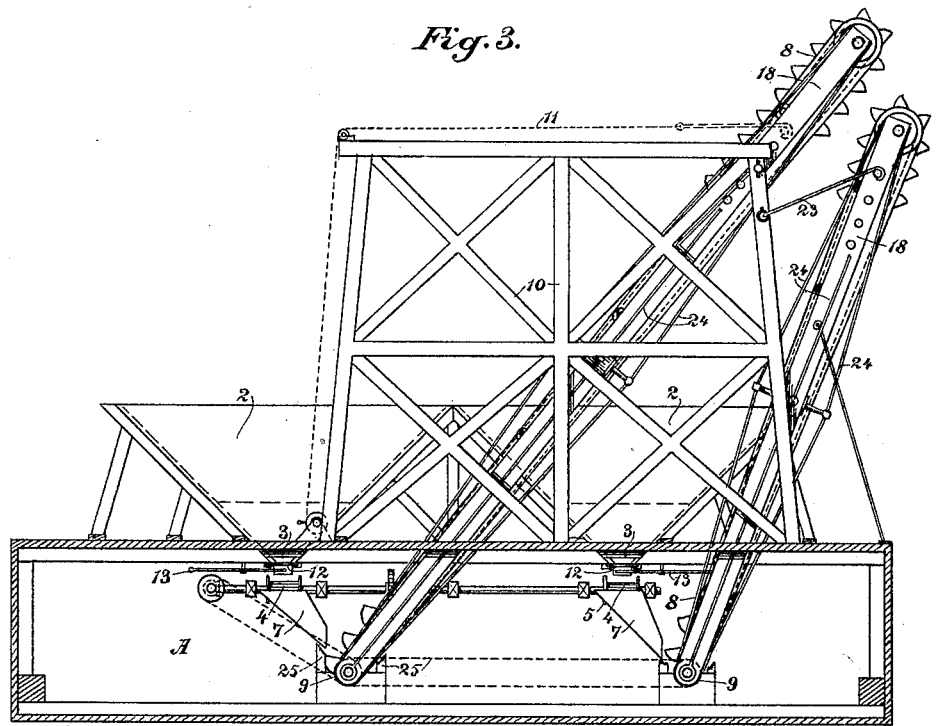
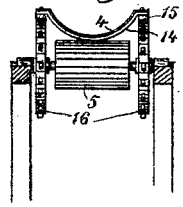
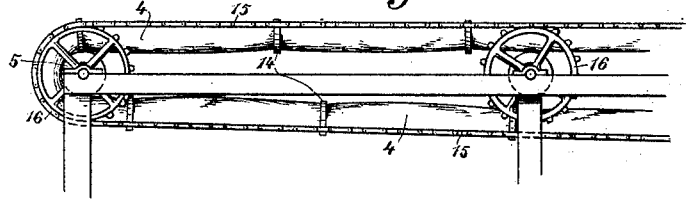
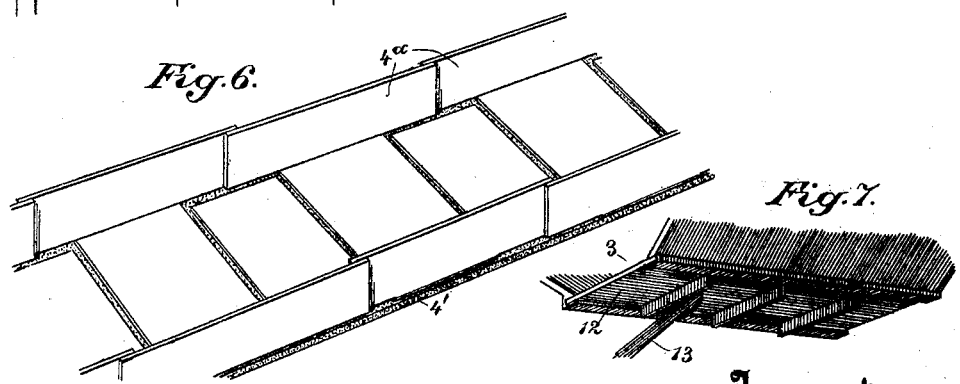

UNITED STATES PATENT OFFICE.

GEORGE P. WETMORE, OF SAN FRANCISCO, CALIFORNIA.

VESSEL-UNLOADING APPARATUS.

SPECIFICATION forming part of Letters Patent No. 690,089, dated December 31, 1901.

Application filed March 20, 1901. Serial No. 52,024. (No model.)

*To all whom it may concern:*

Be it known that I, GEORGE P. WETMORE, a citizen of the United States, residing in the city and county of San Francisco, State of California, have invented an Improvement in Vessel-Unloading Apparatus; and I hereby declare the following to be a full, clear, and exact description of the same.

My invention relates to a means for unloading vessels. It is especially designed for discharging broken rock and the like from barges and other vessels on which it is conveyed.

The invention consists of the parts and the constructions and combinations of parts hereinafter described and claimed.

Figure 1 is a longitudinal section through the device. Fig. 2 is a detail of the support for the elevators. Fig. 3 is a cross-section through the scow, taken in front of the elevators. Figs. 4 and 5 are detail views of one form of a carrier-belt. Fig. 6 shows another form. Fig. 7 is a view of a gate and its connections.

My apparatus is applicable to any form of vessel which may be employed for transportation of material. In the present drawings I have shown it as applied to a flat-bottomed barge or scow, as A. Upon this vessel, at a suitable height above the bottom to admit of the carriers being placed beneath them, are the receiving compartments 2. These may be arranged in line with each other side by side and subdivided as may be found most convenient for the work. I have here shown four of the compartments standing two in line with each other and also transversely side by side. The bottoms of these compartments are provided with funnel-shaped discharge-openings, as 3, and these have suitable controlling-gates. Beneath these compartments and their discharge-funnels are traveling carriers 4. These may be in the form of endless belts formed of any sufficiently flexible and resistant material, so that they will not be rapidly worn by the rock. As here shown, these belts 4 pass around drums 5, and power may be applied to them from any suitable motor, as 6, so that the carriers are caused to travel toward a point of discharge suitably located with relation to the different compartments. I have here shown this discharge as being approximately central of the apparatus, and the carrying-belts discharge through chutes, as at 7, upon traveling elevator-belts 8. These belts pass around drums, as 9, journaled in the lower part of the vessel and over similar drums supported upon a derrick or framework, as 10, sufficiently high to allow the elevators to lift the material from the vessel to the dock or other point of discharge. The elevators have frames, which are suspended from the derrick by ropes, as at 11, and the frames being turnable about the axes of the lower drums at 9 it will be seen that the elevators may be raised, so as to stand in an essentially vertical position while the vessel is traveling from the point of loading to the point of discharge, and when the latter has been reached they may be let down to any desired angle to suit the point of discharge.

The object of this apparatus is to provide for the cheap and easy handling of rock used in concrete building purposes and like materials by allowing it to be loaded in bulk at a distant quarry and then to be mechanically discharged with but little handling. For this purpose the compartments into which the rock is loaded are provided with a series of discharge chutes or funnels opening out of the bottom, and by means of the gates controlling these discharge-openings they may be opened successively to a degree which will allow the traveling belts or carriers to be continuously loaded, and when one part of the compartment has been emptied a second discharge can be opened, and so on until the whole compartment has been emptied. Each compartment may be emptied in the same manner or it may be emptied simultaneously.

The gates 12 may be operated in any well-known or desired manner. I have here shown slide-gates with fulcrumed levers 13, so connected as to open and close them.

The carrying-belts 4' (shown in Fig. 6) may be made of plates of metal fixed to and carried by an endless flexible band, which they protect, and side plates 4ᵃ, overlapping and movable with relation to each other when passing around the end drums, or the flexible belt may be inclosed at intervals and its concavity maintained by rigid segmental bands 14, as in Figs. 4 and 5, in which the ends of the segments are supported upon the propelling-chains 15, which pass around sprocket-wheels, as at 16. Bearing rollers or drums 17 are journaled at intervals to support the belt or carrier and its load and prevent its sagging. Where the belt passes around the drum 5 at its discharge end, the depressed portion of the belt is supported by the drum.

Fig. 2 shows a partial section of the lower ends of the side timbers 18 of the elevating apparatus and the supporting and drum shafts 19 and 20, journaled in line with each other. The shafts 19 rest upon suitable supports, as 19ª, and their inner ends fit in boxes 21, which also receive the ends of the shaft 20, turnable in said boxes and abutting against the shafts 19. These latter shafts support the boxes 21, and the ends of the elevator frame-timbers 18, which rest upon the boxes in which the drum-shafts are turnable, may thus be turned about the axis common to them and to the elevator belt-drums. This allows these parts to be tilted to any desired angle without altering the tension of the elevator belts or chains. The driving-sprockets 22 are fixed to the shaft 20. The braces 23 from the upper part of the elevator-frame 18, diverging and connected to the main frame 10, serve to steady the elevator and prevent side swaying motion, and these frames may be further stiffened by truss-rods, as at 24.

In order to distribute the load and relieve the bottom of the vessel of too much weight, the elevator-frames are supported by supplemental hanging frames 25 with suspending-rods from the deck-beams, as at 26, Fig. 1.

Having thus described my invention, what I claim as new, and desire to secure by Letters Patent, is—

1. The combination with a barge or vessel, of a series of compartments having discharge-chutes with controlling-gates, an endless traveling carrier located beneath and adapted to receive the discharge from either of the chutes, a framework with endless elevator, a drum and driving shaft about which the lower end of the elevator passes, supports axially in line with the driving-shaft upon which the lower ends of the elevator-frame are supported, and means for delivering the material from the carrier to the elevator.

2. The combination with a vessel or barge of a series of compartments located above the bottom of the vessel having a number of discharge-openings and controlling-gates through the bottom and in line with each other, an endless traveling carrier located beneath the line of discharge-openings, an elevator and a frame upon which it is carried, a driving-shaft, and a drum over which the lower end of the elevator passes, supports axially in line with the shaft and upon which the lower ends of the elevator-frame are supported, a driving mechanism from which power is communicated to drive the carrier and elevator in unison, and a chute adapted to receive material from the carrier and deliver it to the elevator.

3. An apparatus for mechanically unloading vessels consisting of compartments raised above the bottom of the vessel and adapted to contain the material to be transported, funnel-shaped discharge-openings formed in line contiguous to each other in the bottom of the compartments, gates by which said openings are controlled, endless traveling carriers located beneath the lines of discharge-openings of each of the compartments and adapted to deliver material, one or more elevators having supporting-frames which are turnable about the driving and fulcrum shafts at the lower end, a fixed derrick or structure and connections between it and the elevator-frames whereby the angles of the latter may be changed at will.

4. In an apparatus for transporting and delivering material, a framework with endless elevating-belt, a drum and driving shaft about which the lower end of the elevator-belt passes, and supports axially in line with the shaft upon which the lower ends of the frame are supported.

5. In an apparatus for transporting and delivering material, a framework with endless elevating-belt, a drum and driving shaft about which the lower end of the elevator-belt passes, shafts supported in line with the drum-shaft, having boxes in which the ends of the drum-shaft are turnable, said boxes also forming supports for the lower ends of the frame-timbers whereby they are turnable about a common axis.

6. The combination with a vessel or barge of a series of compartments having discharge-chutes and controlling-gates at the bottom, an endless traveling carrier located beneath and adapted to receive the discharge from either of the chutes, an elevator, the receiving end of which is located below the carrier, a chute adapted to receive the material from the carrier and deliver it to the elevator, a framework upon which the lower end of the elevator is carried, a driving-shaft for the elevator, supports axially in line with said shaft and upon which the lower ends of the elevator-framework are supported, means for driving the shaft, and suspension connections between said framework and the deck-timbers of the vessel.

7. An apparatus for transporting and delivering material, including an endless traveling elevator, a driving-shaft around which one end of the elevator passes, supports axially in line with the shaft and upon which one end of the elevator-frame is supported, and connections between said supports and the deck-timbers of the vessel, whereby the weight is divided between the deck and bottom of the vessel.

In witness whereof I have hereunto set my hand.

GEORGE P. WETMORE.

Witnesses:
S. H. NOURSE,
JESSIE C. BRODIE.